(No Model.)
J. MILLER.
THRASHING AND CLEANING MACHINE.
No. 275,244. Patented Apr. 3, 1883.
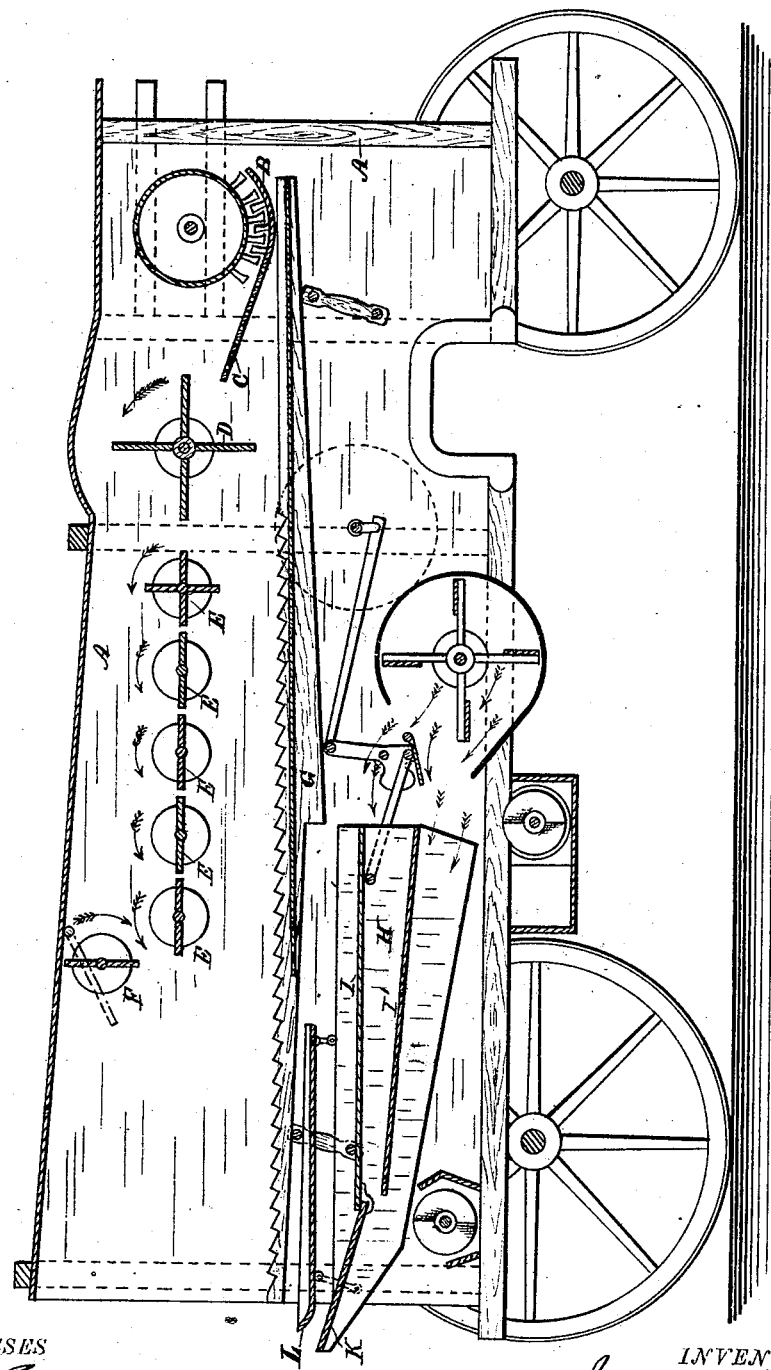
WITNESSES
INVENTOR
Jacob Miller
Attorney

UNITED STATES PATENT OFFICE.

JACOB MILLER, OF CANTON, OHIO.

THRASHING AND CLEANING MACHINE.

SPECIFICATION forming part of Letters Patent No. 275,244, dated April 3, 1883.

Application filed April 7, 1882. Renewed January 27, 1883. (No model.)

*To all whom it may concern:*

Be it known that I, JACOB MILLER, of Canton, in the county of Stark and State of Ohio, have invented a new and useful Improvement in Thrashing and Cleaning Machines, of which the following, when taken in connection with the accompanying drawing, is a full, clear, and exact description.

My invention relates to improvements in grain thrashing and separating machines; and it consists in certain details of construction hereinafter more fully described, and pointed out in the claims.

Referring to the drawing, which illustrates my invention, in one figure and in a vertical longitudinal section, A designates a frame of suitable construction, mounted on wheels, and provided with a thrashing-cylinder at its front end, as is common in this class of machines.

B is the concave, provided with suitable teeth, in the usual manner. This concave is provided with a perforated extension, C, which extends backward some distance from the cylinder, and is placed in a slanting position, so that the straw, chaff, &c., will be deflected in an upward direction as it leaves the thrashing-cylinder.

To the rear of and slightly above the end of the extension C is a reel or beater, D, suitably mounted in the sides of the machine, and to which motion is imparted in the direction of the arrow by any suitable means. The office of this reel or beater D is to raise the straw as it leaves the extension of the concave and carry it upward and rearward, and at the same time impart to the straw a beating action, which will free the straw of loose grain and allow it to fall onto the shaker-board and to the separating devices below. By placing the beater D at the rear end of and above the extension C, I also form a barrier of the beater and the traveling straw, which will act as a stop and prevent the loose grains from flying out of the machine.

E E E are a series of reels or beaters, mounted in bearings in the sides of the machine, and to which motion is imparted by any suitable means. The object of these reels or beaters is to receive the straw from the beater D and carry it rearward, and at the same time free it from grain, and also prevent the straw from coming in contact with the front end of the shaker-board or carrier. A deflecting reel or beater, F, (or board, as shown in dotted lines,) serves to deflect the straw down onto the rear end of the shaker or carrier, by which it is worked off over the rear end of the machine. By this construction or arrangement of reels or beaters the straw is exposed to a violent beating and shaking action from the time it leaves the thrashing-cylinder until it reaches the rear end of the machine, and is also kept from contact with the shaker-board and shaker until it reaches a point some distance back over the separating-shoe, and is thus prevented from packing down on the shaker or carrier.

G is a shaker-board and straw-carrier, the front end of which extends to the front of the thrashing-cylinder. The shaker and carrier G is made with a close bottom a greater portion of its length, as is shown, and is hung so as to incline in a slightly-downward direction from the front to the rear of the machine, so that the grain and chaff which fall through the perforated extension of the concave C and that which is beaten from the straw by the action of the beaters D, E, and F will be carried rearward and deposited on the riddles and subjected to the action of the air-blast. The rear portion of the carrier G is open to allow the grain to fall through into the separating-shoe, and a series of serrated strips, which enter into the structure of the shaker, serve to work any straw rearward which may have dropped down between the beaters and that which is brought back by said beaters. The shaker or carrier G is hung in pivoted bearings, in the usual manner, and has imparted to it a reciprocating or shaking motion by any suitable and well-known devices.

The separating-shoe H is provided with riddles $i$ and $i'$, the riddle $i$ being provided with an upwardly-inclined extension, K, which prevents the light grain from being blown over the end of the machine by the air-blast.

L is a shaker-board which receives and conducts back to the riddles any loose grain which may have found its way to the rear of the machine. This shaker-board, together with the separating-shoe H, has a shaking motion imparted to it by any suitable means.

The air-blast fan, together with the endless screws for conveying the tailings and cleaned grain to one side of the machine, is of the usual construction, and need not be more particularly described here.

I am aware that it is not broadly new to use a series of reels or beaters for conveying straw through a thrashing and separating machine, and such I do not broadly claim.

Having described my invention, what I claim, and desire to secure by Letters Patent, is—

1. The combination of the thrashing-cylinder and concave with the inclined extension C and beaters D and E E, as set forth.

2. The combination of the thrashing-cylinder, concave, and perforated extension C with the beaters D and E E and beater or deflecting-board F, as described, whereby the straw is elevated after leaving the thrashing-cylinder and conducted rearward above the shaker-board, and finally deflected down onto the rear end of the carrier, as set forth.

JACOB MILLER.

Witnesses:
M. W. CRAMER,
ROBT. A. MILLER.